US011592890B2

United States Patent
Ho et al.

(10) Patent No.: US 11,592,890 B2
(45) Date of Patent: Feb. 28, 2023

(54) SYSTEM AND METHOD FOR INFORMATION HANDLING SYSTEM (IHS) OPTIMIZATION USING CORE STALL MANAGEMENT TECHNOLOGY

(71) Applicant: Dell Products, L.P., Round Rock, TX (US)

(72) Inventors: Chia-Chi Ho, Taoyuan (TW); Thomas Alexander Shows, Leander, TX (US); Ya-Chen Tsai, New Taipei (TW); Chung-Wei Wang, Taipei (TW); Yi-Chung Cheng, Taipei (TW)

(73) Assignee: Dell Products, L.P., Round Rock, TX (US)

( * ) Notice: Subject to any disclaimer, the term of this patent is extended or adjusted under 35 U.S.C. 154(b) by 143 days.

(21) Appl. No.: 17/187,927

(22) Filed: Mar. 1, 2021

(65) Prior Publication Data
US 2022/0276690 A1    Sep. 1, 2022

(51) Int. Cl.
*G06F 1/32*    (2019.01)
*G06F 1/324*    (2019.01)

(52) U.S. Cl.
CPC .................... *G06F 1/324* (2013.01)

(58) Field of Classification Search
CPC ...................................... G06F 1/324
See application file for complete search history.

(56) References Cited

U.S. PATENT DOCUMENTS

| 2014/0068290 | A1* | 3/2014 | Bhandaru | G06F 1/3234 713/320 |
| 2019/0339989 | A1* | 11/2019 | Liang | G06N 20/00 |
| 2020/0341533 | A1* | 10/2020 | Ho | G06F 1/3296 |

* cited by examiner

*Primary Examiner* — Stefan Stoynov
(74) *Attorney, Agent, or Firm* — Fogarty LLP (57) ABSTRACT

Embodiments of a system, method, and memory storage device for managing performance optimization of applications executed by an Information Handling System (IHS) are described. In an illustrative, non-limiting embodiment, an IHS may include computer-executable instructions to receive telemetry data associated with an operating behavior of the IHS. Using the telemetry data, the IHS generates a profile recommendation from the received telemetry data using a machine learning (ML) service, and adjusts a core stall management mechanism of a second processor to optimize a performance of the IHS. The second processor performs at least a portion of the operating behavior of the IHS.

18 Claims, 4 Drawing Sheets

SYSTEM AND METHOD FOR INFORMATION HANDLING SYSTEM (IHS) OPTIMIZATION USING CORE STALL MANAGEMENT TECHNOLOGY

FIELD

The present disclosure relates generally to Information Handling Systems (IHSs), and more particularly, to a system and method for information handling system (IHS) optimization using core stall management technology.

BACKGROUND

Computer power consumption has become a major issue in recent years. Current trends utilizing multi-core architecture processors has eased the pressure on power consumption. However, power consumption still appears to grow linearly with the number of cores utilized. Power and thermal management issues are also important considerations in computer-based systems. Whereas with servers, the cost of electricity drives the need for low power systems, in mobile systems, battery life and thermal limitations are relatively more relevant. Optimizing a system for maximum performance at minimum power consumption is usually accomplished using the operating system (OS) or system software to control hardware elements.

Most modern OS's use the Advanced Configuration and Power Interface (ACPI) standard for optimizing the system in these areas. A typical ACPI implementation allows a processor core to operate in different power-saving states or C-states (also termed low power or idle states), generally referred to as C0 to C11 states, with C0 being the active state and higher ones being deeper sleep states. In addition to power-saving states, performance states or so-called P-states are also provided by the ACPI standard. These performance states may allow control of performance-power levels while a core is in an active state (C0). In general, multiple P-states (P0-PN) may be available. Additionally, a range of higher frequency/performance states can exist, which are generally referred to as turbo mode of operation.

Turbo mode may include a core stall management feature. Core stall management functions to reduce CPU frequency on a per core basis based on stalls reported by the CPU. A stall occurs when the core is waiting for something, like a memory transaction. If core stall management is disabled, the CPU should deliver slightly higher performance but consume more power. Conversely, if core stall management is enabled, the CPU should have lower average power and slightly lower performance.

SUMMARY

Embodiments of a system, method, and memory storage device for managing performance optimization of applications executed by an Information Handling System (IHS) are described herein below. In an illustrative, non-limiting embodiment, an IHS may include computer-executable instructions to receive telemetry data associated with an operating behavior of the IHS. Using the telemetry data, the IHS generates a profile recommendation from the received telemetry data using a machine learning (ML) service, and adjusts a core stall management mechanism of a second processor to optimize a performance of the IHS. The second processor performs at least a portion of the operating behavior of the IHS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Modern day central processing units (CPUs) may be provided with one or more dynamic performance enhancing features. One of those features involve a core stall management feature in which it continually seeks to ramp an operating frequency of the CPU until it reaches a certain stall state level. A stall state generally refers to a condition at which the CPU is waiting for some other resource (e.g., storage resource, GPU resource, etc.) in the IHS in order to resume its own operation. A stalled core, either due to workload mix or application memory access patterns, is not frequency friendly and unable to provide improved performance from increased operating frequency. Thus, the core stall management feature seeks to continually ramp operating frequency while minimizing the level of core stall states.

Modern CPUs have multiple cores and are often referred to as multi-core processors. In general, a multi-core processor is a computer processor on a single integrated circuit with two or more separate processing units, called cores, each of which reads and executes program instructions. Within this disclosure, reference to a core and a CPU shall be interchangeably construed to mean either or both a core of a CPU or the CPU itself.

Stalls are a function of workload mix and cache/memory access pattern of the application running on the core. Cache-friendly applications are those whose entire working set fits in the cache. In contrast, cache streaming or thrashing applications constantly seek new data and sweep through the cache. Increased stalls indicate the application is unlikely to benefit from being run at a higher frequency without a commensurate reduction in stalls.

One particular embodiment of a core stall management feature is an energy efficient turbo (EET) feature provided on most or all processors manufactured by Intel™ since its $9^{th}$ Generation line of products (i.e., $9^{th}$ Generation onward). Initially, the EET feature was provided with a default value of enabled. That is, the EET feature was default enabled and would only be turned off by assertively instructing the CPU to do so. From the $11^{th}$ Generation line of products, however, the EET feature was disabled by default. This created a problem where configurations that were previously meeting their battery life requirements were then no longer meeting those requirements. Nevertheless, early implementations did not function adequately. One reason may be that power usage is non-linear with the operating frequency of a processor. Unless performance improvements are obtained by operating in a turbo range, the increased power consumption is unjustified. Conventional EET management techniques involved ramping a turbo-seeking core to a frequency at which its stalls as determined by a fixed configurable threshold. But because the stall condition that the processor typically encounters are based on other resources in the IHS, it has been difficult to predict when and how to manage activation of the EET feature. As such, Intel™ CPU product lines since its 13th Generation line of products have been provided with a default value of disabled due, in large part, to the generally unpredictable nature of the processing behavior within an IHS.

Figure 1:
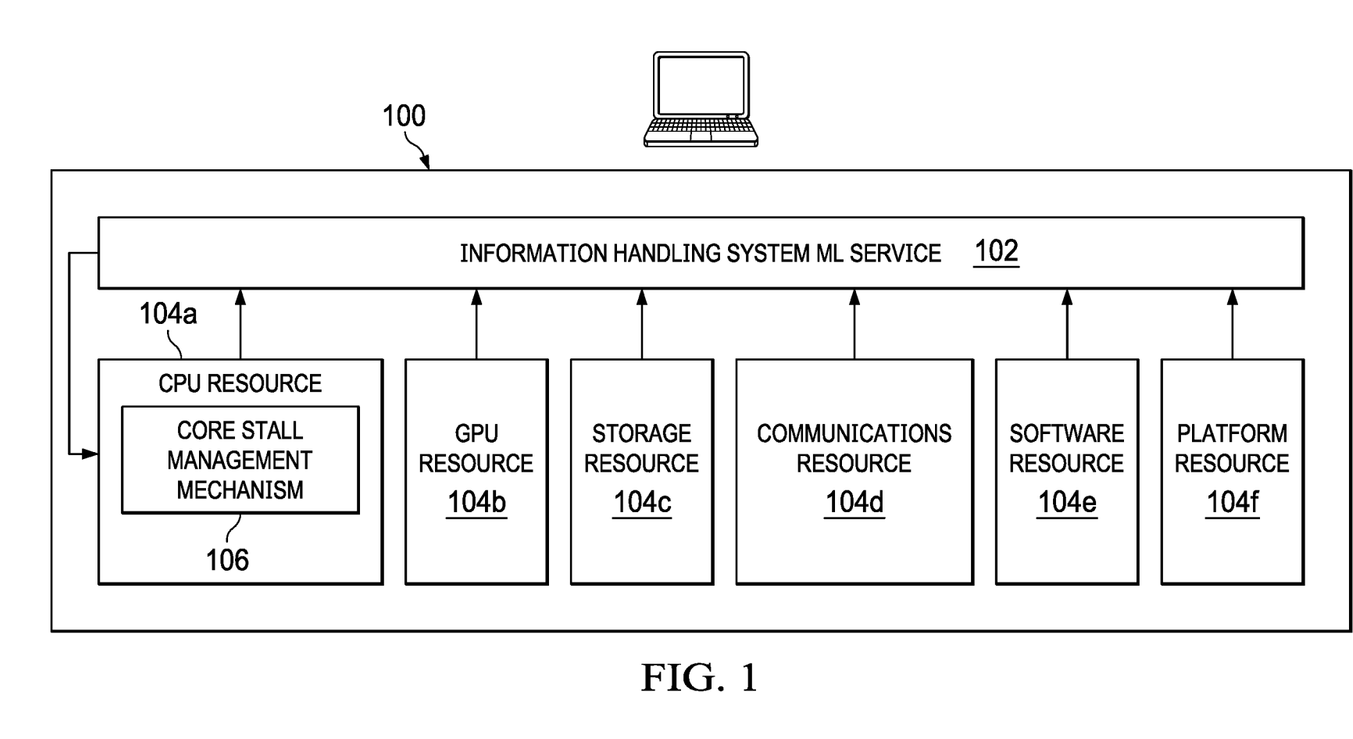
FIG. 1 illustrates an example information handling system (IHS) that may be implemented with an IHS machine learning (ML) service according to one embodiment of the present disclosure.

FIG. 1 illustrates an example information handling system (IHS) 100 that may be implemented with an IHS machine learning (ML) service 102 according to one embodiment of the present disclosure. As shown, IHS 100 includes various resources, such as CPU resources 104a, GPU resources 104b, storage resources 104c, communication resources 104d (e.g., Ethernet, USB, etc.), software resources 104e (e.g., operating system (OS), one or more applications executed on IHS, drivers, etc.), and various platform resources 104f (e.g., communication systems, peripheral devices, power/thermal control systems, etc.) that may be used to perform the various functions of the IHS 100. The CPU resource 104a is configured with a core stall management mechanism 106. According to embodiments of the present disclosure, IHS ML service 102 may control activation of the core stall management mechanism 106 based on telemetry data obtained from other resources, such as GPU resources 104b, storage resources 104c, communication resources 104d, software resources 104e, platform resources 104f, and the like. Thus, the IHS ML service 102 may provide system wide optimization for IHS 100 by coordinating the operation of some, most, or all resources with that of the core stall management mechanism 106.

Within this disclosure, the term "resources" may be collectively used to describe the CPU resources 104a, GPU resources 104b, storage resources 104c, communication resources 104d, software resources 104e, and/or platform resources 104f that form the IHS 100. In certain cases, IHS ML service 102 may be configured to directly receive telemetry data from those resources, and generate profile recommendations that may be used to control or adjust operation of the core stall management mechanism 106. In some cases, certain ones of the CPU resources 104a, GPU resources 104b, storage resources 104c, communication resources 104d, software resources 104e, platform resources 104f may be individually managed by other ML services. As such, IHS ML service 102 may generate ML-based hints that are provided to those ML services using a ML-to-ML hinting technique. ML-based hints generally refer to output parameters of a ML-based optimization service, such as profile recommendations, resource performance features, classification information, raw telemetry data, and the like that may be shared among participating ML services to coordinate their optimization with one another.

Whereas the core stall management feature available in many CPUs nowadays would otherwise be able to provide enhanced performance, it has not been extensively used due to, among other things, other non-CPU based resources whose actions have not been sufficiently predictable to warrant its use. That is, other resources, such as storage resources, may incur their own stall conditions or states independently of when the CPU experiences its stall states such that stall contention is encountered. Embodiments of the present disclosure provide a solution to this problem by providing a IHS ML learning service 102 that learns the behavior of other resources in the IHS 100 so that the stall conditions of most or all resources can be predicted. Given this prediction, system 102 may adjust activation of the core stall management feature so that it can provide an IHS having enhanced performance over traditional core stall management mechanisms.

For example, IHS ML service 102 may learn the behavior of the user and/or IHS to predict that a relatively large write storage operation is predicted to occur when a particular application is launched, or a certain amount of time after that application is launched. Given this prediction, the IHS ML service 102 may adjust activation of the core stall management mechanism 106 so that any potential stall contention between the CPU resource 104a and storage resource 104c can be remediated. As another example, IHS ML service 102 may detect that the storage resource 104c is currently experiencing a large amount of loading irrespective of any learned predicted behavior, and as such, adjust activation of core stall management mechanism 106 so that stall contention between the CPU resource 104a and storage resource 104c can be remediated. Thus, it may be clearly seen that coordinating the operation of core stall management feature 106 with the operation of other resources in the IHS 100 may enable the core stall management mechanism 106 to provide optimal performance for the IHS 100 without causing undue burden on the IHS, such as via excessive power usage.

In one embodiment, IHS ML service 102 may be configured to respond to detection of AC power to activate core stall management mechanism 106 independently of any ML optimization process. Via experimentation with portable devices, such as laptop computer, notebook computers, cellular telephones, and the like, it has been determined that activation of core stall management mechanism 106 when the portable device is in a battery power state, may provide enhanced efficiency so that the battery can run for longer periods of time in between charges. In one embodiment, whether IHS ML service 102 controls activation of core stall management mechanism 106 according to a ML optimization process, according to detection of battery power, and/or a combination thereof may be set manually by a user or by one or more processes executed on the IHS 100, such as IHS ML service 102 itself.

In one embodiment, the IHS ML service 102 takes into consideration any user and/or OS specified energy performance bias (EPP) settings. In one embodiment, the EPP may be based on user input to an OS-based user preference menu to indicate a user's preference as to a power/performance tradeoff. With a performance bias, an application running on a core that is not stalled may be granted a maximum turbo frequency, but with an energy bias the core may have its frequency incremented, for example, by a unit step or other suitable incremental amount.

Embodiments of the IHS ML service 102 may detect core stalls and core active cycles, such as via the core activity sensor and core stall sensor, to determine the proportion of cycles a core is stalled compared to the cycles it is active, termed core-centric unproductive time. This core-centric unproductive time can be meaningful and reliable regardless of the actual core and non-core (e.g., uncore) interconnect operating frequencies, and thus serves well to classify a core as stalled or not using a single threshold. In various embodiments, this threshold may be configurable and can be a function of the system EPP.

In one embodiment, the IHS ML service 102 periodically analyzes all cores granted turbo mode to determine whether their frequency should be increased, decreased or left unchanged based on whether the core has been classified as stalled or not over the observation interval. Cores running applications that fit in their private cache over consecutive observation cycles (provided there exists power budget and no electrical, thermal or other constraints being violated) will reach the maximum turbo frequency. In scenarios where the workload mix changes and there is increasing cache contention, over time the turbo frequency of the affected cores will be reduced (e.g., steeply if the system is configured for energy bias or more slowly if configured with performance bias).

Figure 2:
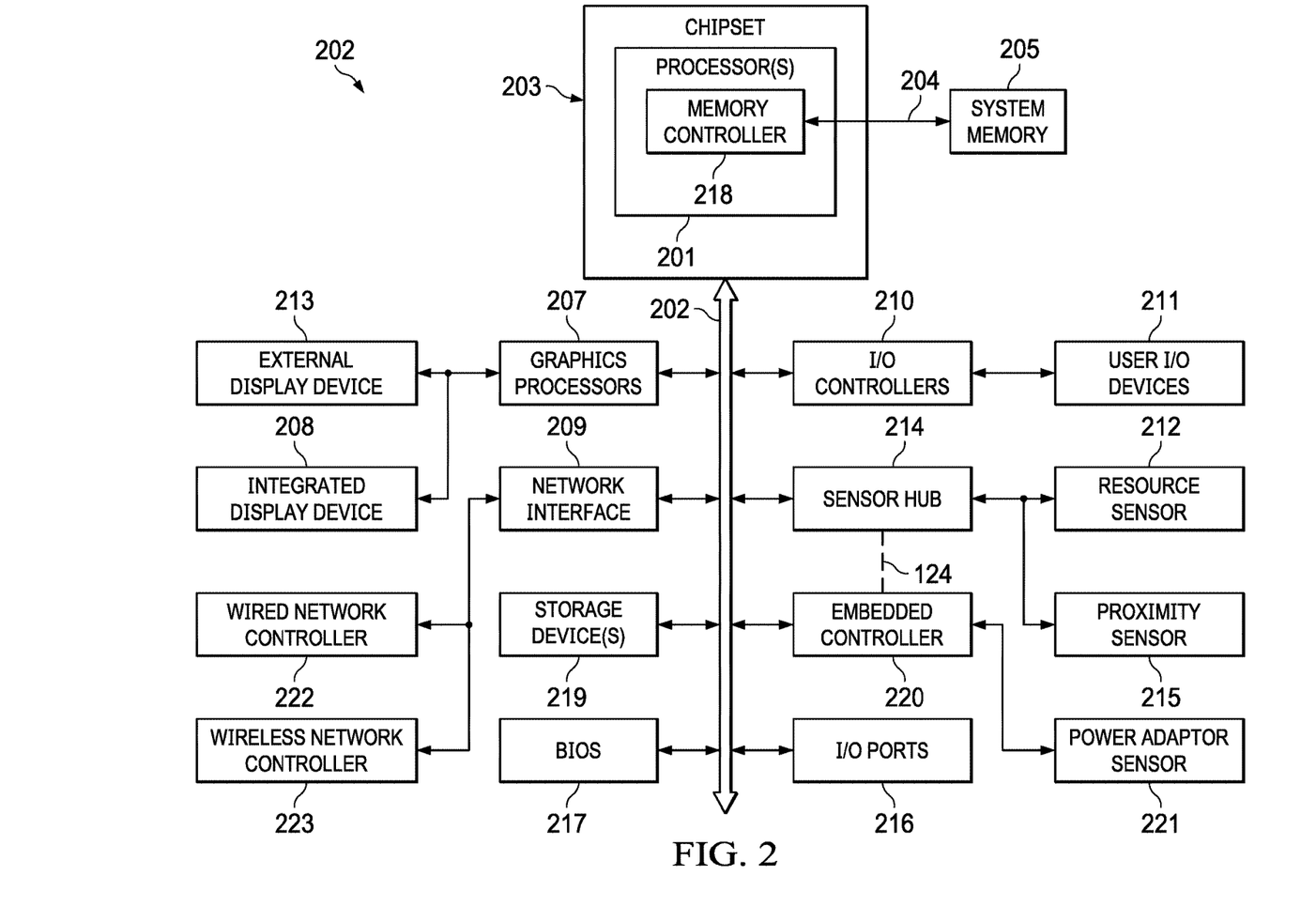
FIG. 2 is a block diagram illustrating components of an example IHS that may be configured to manage performance optimization of applications according to one embodiment of the present disclosure.

FIG. 2 is a block diagram illustrating components of an example IHS 200 that may be configured to manage performance optimization of applications according to one embodiment of the present disclosure. IHS 200 may be incorporated in whole, or part, as IHS 100 of FIG. 1. As shown, IHS 200 includes one or more processors 201, such as a Central Processing Unit (CPU), that execute code retrieved from system memory 205. Although IHS 200 is illustrated with a single processor 201, other embodiments may include two or more processors, that may each be configured identically, or to provide specialized processing operations. Processor 201 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 2, processor 201 includes an integrated memory controller 218 that may be implemented directly within the circuitry of processor 201, or memory controller 218 may be a separate integrated circuit that is located on the same die as processor 201. Memory controller 218 may be configured to manage the transfer of data to and from the system memory 205 of IHS 200 via high-speed memory interface 204. System memory 205 that is coupled to processor 201 provides processor 201 with a high-speed memory that may be used in the execution of computer program instructions by processor 201.

Accordingly, system memory 205 may include memory components, such as static RAM (SRAM), dynamic RAM (DRAM), NAND Flash memory, suitable for supporting high-speed memory operations by the processor 201. In certain embodiments, system memory 205 may combine both persistent, non-volatile memory and volatile memory. In certain embodiments, system memory 205 may include multiple removable memory modules.

IHS 200 utilizes chipset 203 that may include one or more integrated circuits that are connected to processor 201. In the embodiment of FIG. 2, processor 201 is depicted as a component of chipset 203. In other embodiments, all of chipset 203, or portions of chipset 203 may be implemented directly within the integrated circuitry of the processor 201. Chipset 203 provides processor(s) 201 with access to a variety of resources accessible via bus 202. In IHS 200, bus 202 is illustrated as a single element. Various embodiments may utilize any number of separate buses to provide the illustrated pathways served by bus 202.

In various embodiments, IHS 200 may include one or more I/O ports 216 that may support removable couplings with various types of external devices and systems, including removable couplings with peripheral devices that may be configured for operation by a particular user of IHS 200. For instance, I/O 216 ports may include USB (Universal Serial Bus) ports, by which a variety of external devices may be coupled to IHS 200. In addition to or instead of USB ports, I/O ports 216 may include various types of physical I/O ports that are accessible to a user via the enclosure of the IHS 200.

In certain embodiments, chipset 203 may additionally utilize one or more I/O controllers 210 that may each support the operation of hardware components such as user I/O devices 211 that may include peripheral components that are physically coupled to I/O port 216 and/or peripheral components that are wirelessly coupled to IHS 200 via network interface 209. In various implementations, I/O controller 210 may support the operation of one or more user I/O devices 211 such as a keyboard, mouse, touchpad, touchscreen, microphone, speakers, camera and other input and output devices that may be coupled to IHS 200. User I/O devices 211 may interface with an I/O controller 210 through wired or wireless couplings supported by IHS 200. In some cases, I/O controllers 210 may support configurable operation of supported peripheral devices, such as user I/O devices 211.

As illustrated, a variety of additional resources may be coupled to the processor(s) 201 of the IHS 200 through the chipset 203. For instance, chipset 203 may be coupled to network interface 209 that may support different types of network connectivity. IHS 200 may also include one or more Network Interface Controllers (NICs) 222 and 223, each of which may implement the hardware required for communicating via a specific networking technology, such as Wi-Fi, BLUETOOTH, Ethernet and mobile cellular networks (e.g., CDMA, TDMA, LTE). Network interface 209 may support network connections by wired network controllers 222 and wireless network controllers 223. Each network controller 222 and 223 may be coupled via various buses to chipset 203 to support different types of network connectivity, such as the network connectivity utilized by IHS 200.

Chipset 203 may also provide access to one or more display device(s) 208 and 213 via graphics processor 207. Graphics processor 207 may be included within a video card, graphics card or within an embedded controller installed within IHS 200. Additionally, or alternatively, graphics processor 207 may be integrated within processor 201, such as a component of a system-on-chip (SoC). Graphics processor 207 may generate display information and provide the generated information to one or more display device(s) 208 and 213, coupled to IHS 200.

One or more display devices 208 and 213 coupled to IHS 200 may utilize LCD, LED, OLED, or other display technologies. Each display device 208 and 213 may be capable of receiving touch inputs such as via a touch controller that may be an embedded component of the display device 208 and 213 or graphics processor 207, or it may be a separate component of IHS 200 accessed via bus 202. In some cases, power to graphics processor 207, integrated display device 208 and/or external display device 213 may be turned off, or configured to operate at minimal power levels, in response to IHS 200 entering a low-power state (e.g., standby).

As illustrated, IHS 200 may support an integrated display device 208, such as a display integrated into a laptop, tablet, 2-in-1 convertible device, or mobile device. IHS 200 may also support use of one or more external display devices 213, such as external monitors that may be coupled to IHS 200 via various types of couplings, such as by connecting a cable from the external display devices 213 to external I/O port 216 of the IHS 200. In certain scenarios, the operation of integrated displays 208 and external displays 213 may be configured for a particular user. For instance, a particular user may prefer specific brightness settings that may vary the display brightness based on time of day and ambient lighting conditions.

Chipset 203 also provides processor 201 with access to one or more storage devices 219. In various embodiments, storage device 219 may be integral to IHS 200 or may be external to IHS 200. In certain embodiments, storage device 219 may be accessed via a storage controller that may be an integrated component of the storage device. Storage device 219 may be implemented using any memory technology allowing IHS 200 to store and retrieve data. For instance, storage device 219 may be a magnetic hard disk storage drive or a solid-state storage drive. In certain embodiments, storage device 219 may be a system of storage devices, such as a cloud system or enterprise data management system that is accessible via network interface 209.

As illustrated, IHS 200 also includes Basic Input/Output System (BIOS) 217 that may be stored in a non-volatile memory accessible by chipset 203 via bus 202. Upon powering or restarting IHS 200, processor(s) 201 may utilize BIOS 217 instructions to initialize and test hardware components coupled to the IHS 200. BIOS 217 instructions may also load an operating system (OS) (e.g., WINDOWS, MACOS, iOS, ANDROID, LINUX, etc.) for use by IHS 200.

BIOS 217 provides an abstraction layer that allows the operating system to interface with the hardware components of the IHS 200. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 200 embodiments may utilize sensor hub 214 capable of sampling and/or collecting data from a variety of sensors. For instance, sensor hub 214 may utilize hardware resource sensor(s) 212, which may include electrical current or voltage sensors, and that are capable of determining the power consumption of various components of IHS 200 (e.g., CPU 201, GPU 207, system memory 205, etc.). In certain embodiments, sensor hub 214 may also include capabilities for determining a location and movement of IHS 200 based on triangulation of network signal information and/or based on information accessible via the OS or a location subsystem, such as a GPS module.

In some embodiments, sensor hub 214 may support proximity sensor(s) 215, including optical, infrared, and/or sonar sensors, which may be configured to provide an indication of a user's presence near IHS 200, absence from IHS 200, and/or distance from IHS 200 (e.g., near-field, mid-field, or far-field).

In certain embodiments, sensor hub 214 may be an independent microcontroller or other logic unit that is coupled to the motherboard of IHS 200. Sensor hub 214 may be a component of an integrated system-on-chip incorporated into processor 201, and it may communicate with chipset 203 via a bus connection such as an Inter-Integrated Circuit ($I^2C$) bus or other suitable type of bus connection. Sensor hub 214 may also utilize an $I^2C$ bus for communicating with various sensors supported by IHS 200.

As illustrated, IHS 200 may utilize embedded controller (EC) 220, which may be a motherboard component of IHS 200 and may include one or more logic units. In certain embodiments, EC 220 may operate from a separate power plane from the main processors 201 and thus the OS operations of IHS 200. Firmware instructions utilized by EC 220 may be used to operate a secure execution system that may include operations for providing various core functions of IHS 200, such as power management, management of operating modes in which IHS 200 may be physically configured and support for certain integrated I/O functions.

EC 220 may also implement operations for interfacing with power adapter sensor 221 in managing power for IHS 200. These operations may be utilized to determine the power status of IHS 200, such as whether IHS 200 is operating from battery power or is plugged into an AC power source (e.g., whether the IHS is operating in AC-only mode, DC-only mode, or AC+DC mode). In some embodiments, EC 220 and sensor hub 214 may communicate via an out-of-band signaling pathway or bus 224.

In various embodiments, IHS 200 may not include each of the components shown in FIG. 2. Additionally, or alternatively, IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 201 as an SoC.

Figure 3:
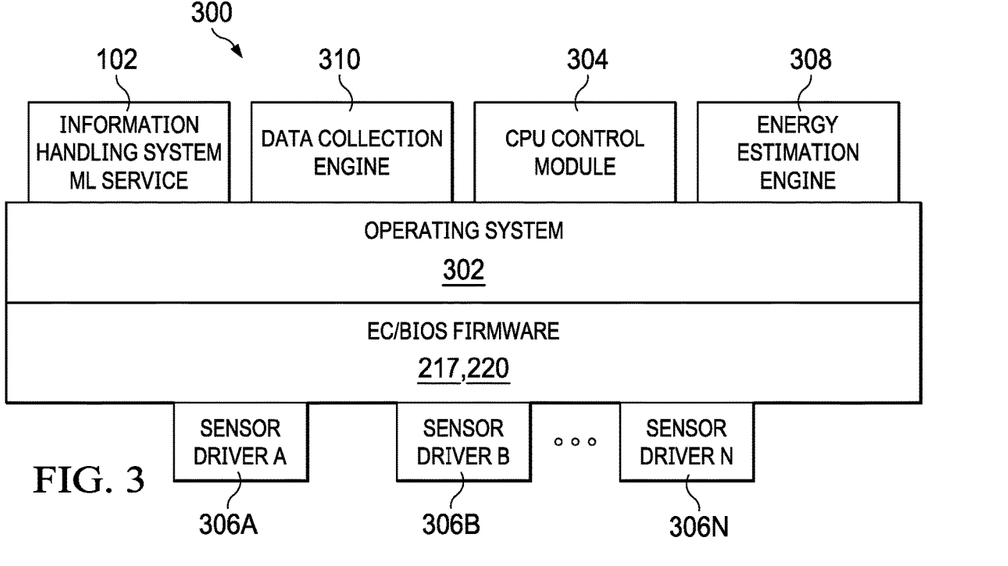
FIG. 3 is a block diagram illustrating an example of a software system produced by IHS according to one embodiment of the present disclosure.

FIG. 3 is a block diagram illustrating an example of a software system 300 produced by IHS 100 according to one embodiment of the present disclosure. In some embodiments, each element of software system 300 may be provided by IHS 100 through the execution of program instructions by one or more logic components (e.g., CPU 201, BIOS 217, EC 220, etc.) stored in memory (e.g., system memory 205), storage device(s) 219, and/or firmware. As shown, software system 300 includes an operating system (OS) 302 that supports IHS ML service 102, a CPU control module 304, an energy estimation engine 308, and a data collection engine 310. Software system 300 may also include one or more sensor modules or drivers 306A-306N, which may abstract and/or interface with hardware resource sensor 212, proximity sensor 215, and power adapter sensor 221, and the like. In one embodiment in which the IHS is a laptop, notebook, or other portable computing device, one sensor driver 306 may include an AC power sensor that detects when the IHS is powered via external power (e.g., AC power adapter), or via battery power.

CPU control module 304 is controlled by IHS ML service 102 to enable or disable the core stall management mechanism 106. The CPU control module 304 may exist as a stand-alone module in software system 300, or be integrated with one or more other software resources of the software system 300. Although CPU control module 304 is shown being supported by OS 302, it should be appreciated that CPU control module 304 may be integrated in, or be supported by BIOS/firmware 217, 220 without departing from the spirit or scope of the present disclosure.

In one embodiment, IHS ML service 102 may include features, or form a part of, the DELL PRECISION OPTIMIZER. The DELL PRECISION OPTIMIZER dynamically configures the IHS 100 to optimize its performance. It also keeps the user informed of any available software updates and applies them when configured to do so. Additionally, it may include a tracking subsystem that can gather data about the IHS 100 and help identify potential problems. In one embodiment, IHS ML service 102 may be provided as a cloud service in which it communicates through a publicly available communication network, such as the Internet, to communicate with the IHS 100 and its associated resources 104 for optimizing activation of core stall management mechanism 106. For example, the IHS ML service 102 may be provided as a subscription service, in which users of IHS 100 may register for providing core stall management feature optimization such as described herein.

IHS ML service 102 is executed by OS 302, which is turn supported by EC/BIOS instructions/firmware 217, 220. EC/BIOS firmware 217, 220 is in communications with, and configured to receive data collected by, one or more sensor modules or drivers 306A-306N, which may abstract and/or interface with hardware resource sensor 212, proximity sensor 215, and power adapter sensor 221. Although shown supported by OS 302, In another embodiment, IHS ML service 102 may comprise a portion of EC/BIOS firmware 217, 220. Implementation of IHS ML service 102 on EC/BIOS firmware 217, 220 may provide relatively quick response times to changes in resources 106 that may affect how core stall management mechanism 106 operates. For example, response times to detection of stalls of certain other resources may require as little as 7 micro-seconds when IHS ML service 102 is implemented in EC/BIOS firmware 217, 220. Therefore, if a storage resource experiences a momentary stall that lasts for approximately 55 micro-seconds, IHS ML service 102 may react quickly enough so that the core stall management mechanism 106 is deactivated for the remaining 48 micro-seconds of the 55 micro-second stall.

In various embodiments, software system 300 also includes an energy estimation engine 308, such as the MICROSOFT E3 engine, which is configured to provide energy usage data broken down by applications, services, tasks, and/or hardware in an IHS. In some cases, energy estimation engine 308 may use software and/or hardware sensors configured to determine, for example, whether a particular application is being executed in the foreground or in the background (e.g., minimized, hidden, etc.) of the IHS's graphical user interface (GUI).

data collection engine 310 may include any data collection service or process, such as, for example, the DELL DATA VAULT configured as a part of the DELL SUPPORT CENTER that collects information on system health, performance, and environment. In some cases, data collection engine 310 may receive and maintain a database or table that includes information related to IHS hardware utilization (e.g., by application, by thread, by hardware resource, etc.), power source (e.g., AC power (adapter plugged in) or battery power (adapter unplugged)), and the like. In one embodiment, IHS ML service 102 may query data collection engine 310 to, among other things, acquire data for learning the behavior of the IHS 100, and/or determining whether IHS 100 is powered via AC power or battery power.

In general, IHS ML service 102 performs a machine learning process to derive certain performance features associated with IHS 100. IHS ML service 102 gathers telemetry data from resources 104, and sensors 306 to characterize their resource utilization. For example, IHS ML service 102 may generate ML-based hints from telemetry data gathered from energy estimation engine 308, data collection engine 310, and/or directly from sensors 306I-306N configured in IHS 100 to generate one or more profile recommendations associated with the performance of IHS 100. Once IHS ML service 102 has collected characteristics over a period of time, it may then process the collected data using statistical descriptors to extract the application performance features of target application 108. For example, IHS ML service 102 may monitor the resources 104 over time to estimate its resource usage with respect to various aspects, such as which actions performed by IHS 100 cause certain resources to encounter loading, and a time period of day in which these actions are encountered. Once IHS ML service 102 has collected characteristics over a period of time, it may then process the collected data using statistical descriptors to extract the performance features associated with IHS 100. From these performance features, the IHS ML service 102 may generate profile recommendations that are used to enable or disable core stall management mechanism 106. IHS ML service 102 may use a machine learning algorithm such as, for example, a Bayesian algorithm, a Linear Regression algorithm, a Decision Tree algorithm, a Random Forest algorithm, a Neural Network algorithm, or the like.

As shown, IHS ML service 102 is stored and executed on the IHS 100 it is configured to provide optimization services for. In other embodiments, IHS ML service 102 may be a cloud provided service in which it communicates through a publicly available communication network, such as the Internet, to communicate with resources 104 for optimizing core stall management mechanism 106. For example, the IHS ML service 102 may be provided as a subscription service, in which users of IHS 100 may register for providing ML-to-ML optimization such as described herein.

Figure 4:
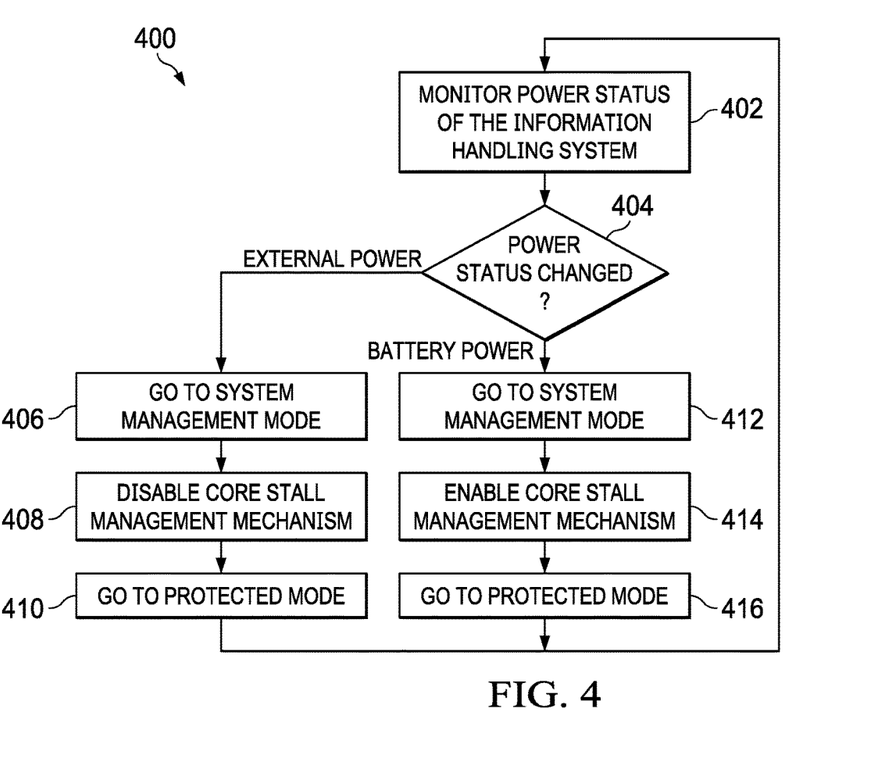
FIG. 4 is an example method that may be performed for activating the core stall management mechanism according to the power status of the IHS according to one embodiment of the present disclosure.

FIG. 4 is a example method 400 that may be performed for activating core stall management mechanism 106 according to the power status (e.g., external power (AC power adapter) or battery power) of IHS 100 according to one embodiment of the present disclosure. Initially, IHS ML service 102 may be started automatically after OS 302 has been initially started, such as when OS 302 is started (e.g., bootstrapped) by system BIOS 217. In another embodiment, IHS ML service 102 may be started manually, such as in response to user input. In yet another embodiment, if IHS ML service 102 is configured as a cloud service, IHS ML service 102 may be started by receiving a request message from IHS 100 to IHS ML service 102, and sending a response message to IHS 100 for initiating a communication channel between IHS 100 and IHS ML service 102.

At step 402, IHS ML service 102 continually monitors the power status of IHS 100, and determines whether or not to take action based upon a change in the power status at step

404. If IHS ML service 102 determines that the power status has changed to external power, processing continues at step 406; otherwise, if it is determined that power status has changed to battery power status, processing continues at step 412.

At step 406, IHS ML service 102 changes the CPU to System Management Mode (SMM). In general, SMM refers to an operating mode of Intel™ based CPUs in which its normal execution is temporarily suspended. Operation of CPU 102 in SMM mode essentially allows the various features (e.g., core stall management mechanism 106) to be modified by certain administrative services or applications. Thereafter at step 408, IHS ML service 102 disables core stall management mechanism 106, and changes the CPU back to protected mode (e.g., normal operating mode) at step 410. At this point, normal operation of the CPU resumes with core stall management mechanism 106 being disabled, and processing continues at step 402 to again continually monitor the power status of IHS 100.

If, however, the power status of IHS 100 has changed to battery power status (e.g., AC adapter unplugged), processing continues at step 412 in which IHS ML service 102 changes the CPU to System Management Mode (SMM). Then at step 414, IHS ML service 102 enables core stall management mechanism 106, and changes the CPU back to protected mode (e.g., normal operating mode) at step 416. At this point, normal operation of the CPU resumes with core stall management mechanism 106 being enabled, and processing continues at step 402 to continually monitor the power status of IHS 100.

The method 400 described above is continually performed during the operation of IHS 100 for setting core stall management mechanism 106 according to the power status of IHS 100 and setting core stall management mechanism 106 accordingly. Nevertheless, when use of method 400 is no longer needed or desired, the method 400 ends.

Figure 5:
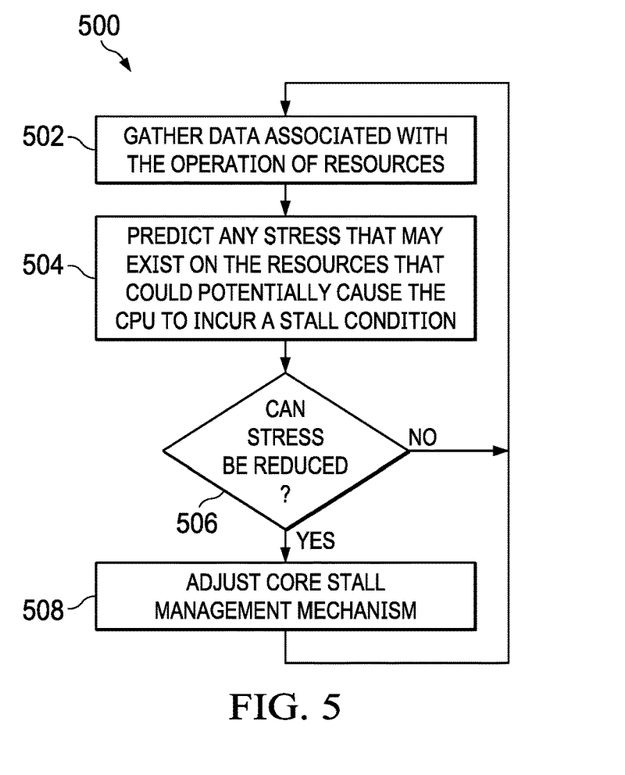
FIG. 5 is a workflow diagram of an example optimization method that may be performed by the various elements of the IHS for performing a ML-based learning and optimization procedure according to one embodiment of the present disclosure.

FIG. 5 is a workflow diagram of an example optimization method 500 that may be performed by the various elements of system 100 for performing a ML-based learning and optimization procedure according to one embodiment of the present disclosure. The optimization method 500 may be performed alternatively, or in conjunction with method 400 as described above with reference to FIG. 4. For example, the optimization method 500 may be performed in lieu of method 400. Additionally, the optimization method 500 may be performed whenever core stall management mechanism 106 is enabled, such as when the IHS 100 is being powered by battery power. In some cases, the optimization method 500 may be performed to learn the behavior of the IHS 100 even when the core stall management mechanism 106 is disabled such that, when it does become enabled, the learned behavior may be used for enhanced optimization of the IHS 100 when the core stall management mechanism 106 is active.

In some embodiments, method 500 may be executed, at least in part, by operation of IHS ML service 102 or other associated process. As noted above, IHS ML service 102 may monitor the resources 106 of IHS 100 to gather data for a predetermined period of time, and use the gathered data to characterize its behavior under varying workloads exhibited on the resources. In various implementations, method 500 may be used to adaptively manage the various characterizations, learning, and/or optimization processes performed by IHS ML service 102 by taking into account information received by energy estimation engine 214, data collection engine 216, and/or sensors 3061-306N.

At step 502, the method 500 collects data associated with the operation of resources (e.g., CPU, GPU, storage, communication, platform, etc.). For example, the method 500 may collect data every 10 seconds at an ongoing basis over a period of time, such as a few days to a few weeks, until sufficient data may be obtained in which one or more performance features of the IHS may be derived.

At step 504, the method 500 predicts any stress (e.g., substantial loading or usage) that may exist on the resources that could potentially cause the CPU to incur a stall condition. For example, the method 500 may predict that, due to the time of day and the type of applications or other processes running on the IHS, stress will likely exist on a certain resource (e.g., storage resource) that may potentially cause a core stall condition on the CPU resource 104*a*. As another example, IHS ML service 102 may predict that, due to the actions currently being performed by a certain application, it will likely be using a relatively large amount of a certain resource that could cause a stall condition on the CPU resource 104*a*.

At step 506, the method 500 determines whether the predicted stress can be reduced by adjustment of core stall management mechanism 106. For example, the method 500 may compare a profile recommendation generated by IHS ML service 102 against a threshold value to determine whether adjustment of the core stall management mechanism 106 using the profile recommendation would provide a sufficient level of performance improvement. If so, processing continues at step 508 for adjusting the core stall management mechanism 106; otherwise, processing continues at step 502 to continually update the learning model of the IHS ML service 102.

The IHS ML service 102 may provide relatively wide flexibility as it uses configurable values for thresholds and the periodicity with which it calculates operating frequencies. Further, the configuration can be a function of an energy performance preference (EPP). The arithmetic expression used to adapt the core frequencies can be a function of the core stalls. A function is considered to be reasonable as long as it meets the following caveats: core frequency monotonically rises under favorable stall conditions and monotonically falls under unfavorable stall conditions.

For example, assume a customer with a computer system including a processor in accordance with an embodiment of the present invention and a given OS runs their own application and has their own power, performance and quality of service needs. These values will be a function of an energy performance preference (EPP) that either or both the user or OS controls. In some embodiments, there may be a graphical user interface (e.g., dashboard) to receive user input to set this threshold value. In some cases, each physical core of the CPU may have an EPP corresponding to the minimum of its logical core EPPs.

At step 508, the method 500 adjusts the core stall management mechanism 106 to optimize the performance of the IHS 100.

The method 500 may optimize the core stall management mechanism 106 in any suitable manner. In one embodiment, the method 500 may optimize the core stall management mechanism 106 by toggling its operation, that is, by either enabling or disabling the core stall management mechanism 106. Other embodiments may involve adjusting the core stall management mechanism 106 by stetting a ramp (increase) rate of the operating frequency, a maximum overclock frequency, a core stall threshold target, and/or a maximum peak core stall period. The ramp rate is the rate at how fast the core stall management mechanism 106 causes the operating frequency of the CPU to increase. The maximum overclock frequency is the maximum operating frequency that the CPU may be increased to using the core stall management mechanism 106. The maximum peak core stall period generally refers to a maximum amount of time at which the CPU can stall before the core stall management mechanism 106 ceases ramping and/or reducing the operating frequency of the CPU. In general, the method 500 may use any suitable means to adjust the core stall management mechanism 106 for optimizing the performance of the IHS 100.

When the core stall management mechanism 106 has been adjusted, processing continues at step 502 to continually update the learning model of the IHS ML service 102. Nevertheless, when use of the method 500 is no longer needed or desired, the method 500 ends.

Although FIG. 5 describes one example of a process that may be performed for enhancing a performance level of an IHS 100 using core stall management mechanism 106, the features of the disclosed process may be embodied in other specific forms without deviating from the spirit and scope of the present disclosure. For example, the method 500 may perform additional, fewer, or different operations than those operations as described in the present example. As another example, the steps of the process described herein may be performed by a computing system other than IHS ML service 102, such as by an embedded controller, such as EC (BIOS) FIRMWARE 217, 220 as described above with reference to FIG. 3. As yet another example, the steps of the process described herein may acquire telemetry data from CPU, GPU, storage, communications, and platform resources to optimize performance of IHS 100 using core stall management mechanism 106, it should be appreciated that other types of resources not explicitly cited herein may also be used to optimize IHS 100 using core stall management mechanism 106 according to embodiments of the present disclosure.

Figure 6:
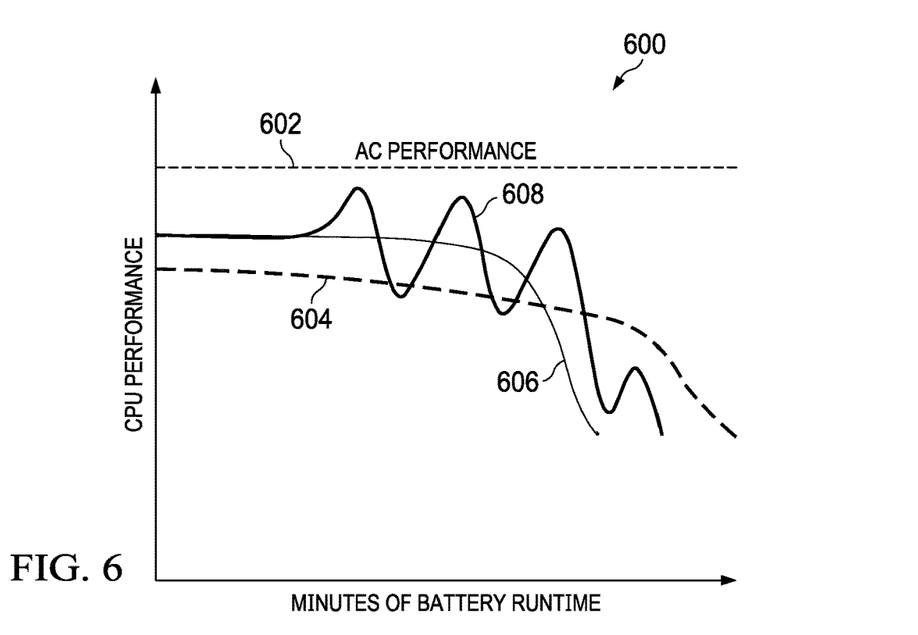
FIG. 6 is a graph illustrating test results of IHS performance over time showing how the IHS ML service may perform versus other conventional operating modes according to one embodiment of the present disclosure.

FIG. 6 is a graph 600 illustrating test results of IHS performance over time showing how the IHS ML service 102 may perform versus other conventional operating modes according to one embodiment of the present disclosure. In particular, line 602 shows IHS performance when operating with external power (e.g., AC power adapter), line 604 represents an energy performance preference (EPP) value that favors battery life and willing to accept relatively lower performance, line 606 represents an EPP value that favors performance and willing to trade battery life in return, while line 608 represents battery life using IHS ML service 102.

EPP is a feature of the Microsoft Windows10™ operating system that provides user selection of performance preferences. The EPP feature is set using a register that stores a value between 0 and 100 in which 0 indicates a maximum CPU performance preference while a value of 100 indicates a maximum power efficiency preference. Thus, line 604 may be the CPU performance resulting from the EPP register value being set to 0, while line 606 may be the CPU performance resulting from the EPP register value being set to 100.

As can be seen, as soon as AC power is removed, a mobile system typically becomes constrained by the power delivery capability of the battery. Additionally, the IHS ML service 102 may provide additional CPU performance while also providing enhanced battery life. The IHS ML service 102 evaluates patterns in how the user operates the system, recognizing when it is likely acceptable to reduce performance based on certain factors, such as foreground tasks, user input, etc.), and provides periods of higher performance followed by periods of higher battery life, which are adjusted according to the habits of the user.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterward be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
   at least one first processor; and
   at least one memory coupled to the at least one processor, the at least one memory having program instructions stored thereon that, upon execution by the at least one processor, cause the IHS to:
receive a plurality of telemetry data associated with an operating behavior of the IHS;
generate a profile recommendation from the received telemetry data using a machine learning (ML) service;
adjust a core stall management mechanism of a second processor to optimize a performance of the IHS, wherein the second processor performs at least a portion of the operating behavior of the IHS; and
enable the core stall management mechanism when the IHS is operating on battery power, and disable the core stall management mechanism when the IHS is operating on external power.

2. The IHS of claim 1, wherein the core stall management mechanism comprises an energy efficient turbo mechanism of a processor.

3. The IHS of claim 1, wherein the telemetry data is obtained from one or more resources of the IHS other than the first and second processors.

4. The IHS of claim 3, wherein one of the one or more resources comprises at least one of a storage resource, a graphics processing unit (GPU) resource, a networking resource, and a platform resource.

5. The IHS of claim 1, wherein the performance of the IHS comprises a battery life performance of the IHS.

6. The IHS of claim 1, wherein the first processor and the second processor are the same processor.

7. The IHS of claim 1, wherein the ML service is provided as a cloud-based service.

8. The IHS of claim 1, wherein the instructions are further executed to adjust the core stall management mechanism by setting the second processor in a system management mode (SMM), and resetting the second processor to a protected mode after the core stall management mechanism has been set.

9. A method comprising:
receiving, using instructions stored in at least one memory and executed by at least one processor, a plurality of telemetry data associated with an operating behavior of the IHS;
generating, using the instructions, a profile recommendation from the received telemetry data using a machine learning (ML) service;
adjust, using the instructions, a core stall management mechanism of a second processor to optimize a performance of the IHS, wherein the second processor performs at least a portion of the operating behavior of the IHS; and
enabling the core stall management mechanism when the IHS is operating on battery power, and disabling the core stall management mechanism when the IHS is operating on external power.

10. The method of claim 9, wherein the core stall management mechanism comprises an energy efficient turbo mechanism of a processor.

11. The method of claim 9, further comprising obtaining the telemetry data from one or more resources of the IHS other than the first and second processors.

12. The method of claim 11, wherein one of the one or more resources comprises at least one of a storage resource, a graphics processing unit (GPU) resource, a networking resource, and a platform resource.

13. The method of claim 9, wherein the performance of the IHS comprises a battery life performance of the IHS.

14. The method of claim 9, wherein the first processor and the second processor are the same processor.

15. The method of claim 9, further comprising providing the ML service as a cloud-based service.

16. A memory storage device having program instructions stored thereon that, upon execution by one or more processors of an Information Handling System (IHS), cause the IHS to:
receive a plurality of telemetry data associated with an operating behavior of the IHS;
generate a profile recommendation from the received telemetry data using a machine learning (ML) service; and
adjust a core stall management mechanism of a second processor to optimize a performance of the IHS, wherein the second processor performs at least a portion of the operating behavior of the IHS; and
enable the core stall management mechanism when the IHS is operating on battery power, and disable the core stall management mechanism when the IHS is operating on external power.

17. The memory storage device of claim 16, wherein the core stall management mechanism comprises an energy efficient turbo mechanism of a processor.

18. The memory storage device of claim 16, wherein the performance of the IHS comprises a battery life performance of the IHS.

* * * * *